(12) United States Patent
Ye et al.

(10) Patent No.: US 8,286,368 B2
(45) Date of Patent: Oct. 16, 2012

(54) METHOD AND APPARATUS FOR RATIONALIZING THE ALLOCATION OF HEAT ENERGY GENERATED FROM CATALYTIC COMBUSTION PROCESS FOR ENAMELING MACHINE

(75) Inventors: Zhide Ye, Dongguan (CN); Benneng Chen, Dongguan (CN); Junkai Sheng, Dongguan (CN); Zhifang Chen, Dongguan (CN); Guozhu Tang, Dongguan (CN)

(73) Assignee: Dongguan Zelong Wire and Cable Co., Ltd., Dongguan, Guangdong (CN)

( * ) Notice: Subject to any disclaimer, the term of this patent is extended or adjusted under 35 U.S.C. 154(b) by 0 days.

(21) Appl. No.: 12/678,474

(22) PCT Filed: Aug. 25, 2009

(86) PCT No.: PCT/CN2009/073509
§ 371 (c)(1),
(2), (4) Date: Mar. 16, 2010

(87) PCT Pub. No.: WO2010/081327
PCT Pub. Date: Jul. 22, 2010

(65) Prior Publication Data
US 2011/0277341 A1 Nov. 17, 2011

(30) Foreign Application Priority Data
Jan. 19, 2009 (CN) .......................... 2009 1 0105133

(51) Int. Cl.
*F26B 21/00* (2006.01)
(52) U.S. Cl. ................. 34/450; 34/479; 34/487; 34/514; 34/72; 34/86; 34/219; 34/477

(58) Field of Classification Search ............ 34/443, 34/450, 467, 477, 478, 479, 487, 492, 514, 34/72, 86, 209, 210, 212, 218, 219
See application file for complete search history.

(56) References Cited

U.S. PATENT DOCUMENTS

| | | | | |
|---|---|---|---|---|
| 2,795,054 A | * | 6/1957 | Bowen, III | 34/514 |
| 5,483,754 A | * | 1/1996 | Gresens | 34/478 |
| 7,581,334 B2 | * | 9/2009 | Majima | 34/86 |

FOREIGN PATENT DOCUMENTS
CN 201122464 Y * 9/2008
* cited by examiner

*Primary Examiner* — Jiping Lu
(74) *Attorney, Agent, or Firm* — Jackson IPG PLLC

(57) ABSTRACT

A method and apparatus for rationalizing the allocation of the heat energy generated from catalytic combustion process for enameling machines wherein a circulating fan is installed above the oven body in a position close to its middle portion; above the front area of the oven body is an organic waste-gas inlet and above which is a primary catalytic chamber. A hot-air allocation chamber is located on the side of the said primary catalytic chamber. The said circulating fan connects the said primary catalytic chamber and the hot-air allocation chamber, delivering the circulating hot air resulting from catalytic combustion into the hot-air allocation chamber which is further connected to the front area, middle area and back area of the oven body via the front air flue, middle air flue and back air flue. With rationalized distribution of heat energy, this invention accelerates the baking speed, thereby improving productivity by 20%. By ensuring effective collection of the waste gas for secondary catalytic combustion and the repeatedly primary catalytic combustion of the circulating hot air, the emission is lowered to 50 mg/m$^3$. Moreover, this invention utilizes the heat energy produced from catalytic combustion process for baking purpose, which helps save power consumption by 50%.

9 Claims, 1 Drawing Sheet

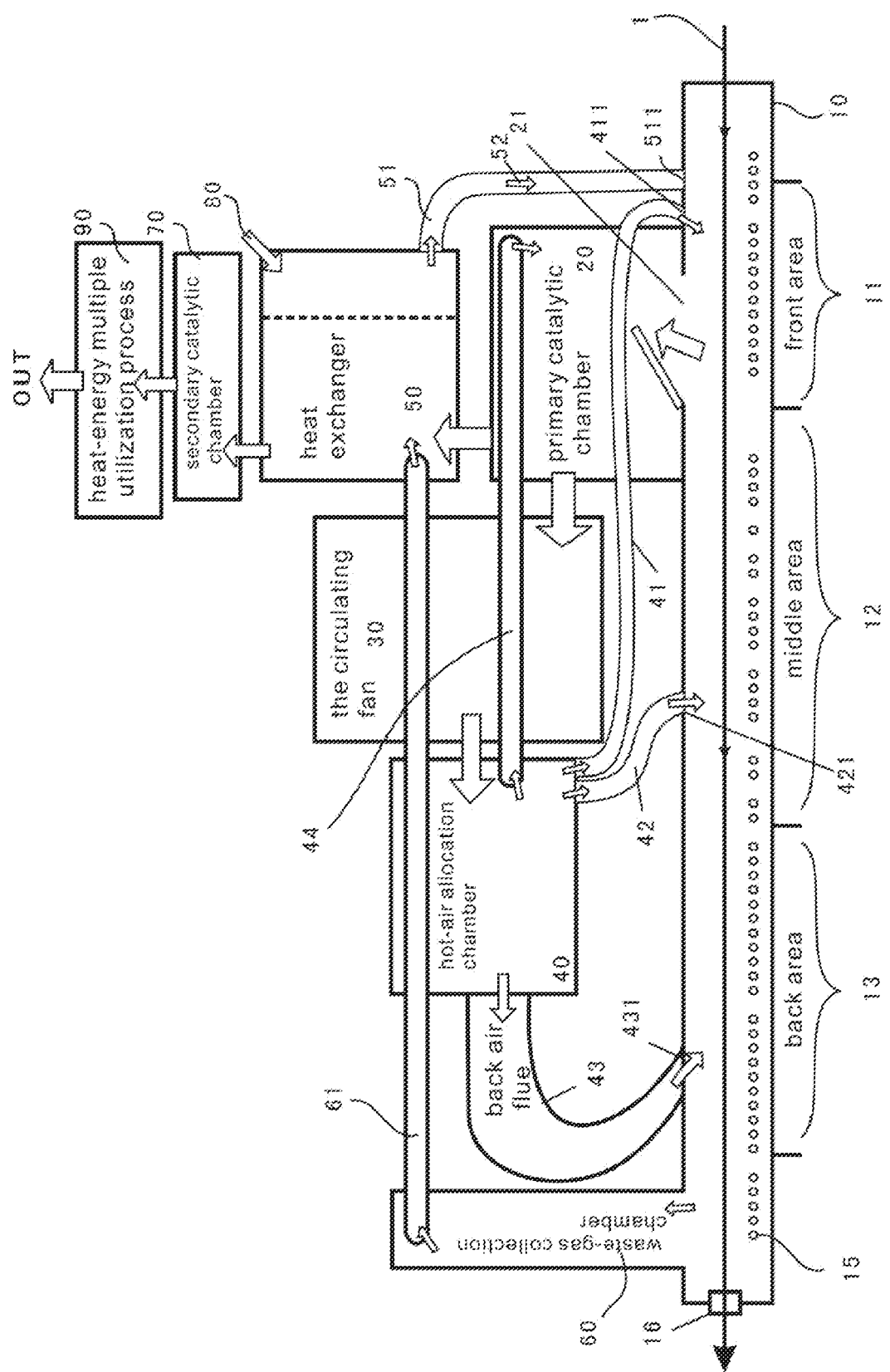

METHOD AND APPARATUS FOR RATIONALIZING THE ALLOCATION OF HEAT ENERGY GENERATED FROM CATALYTIC COMBUSTION PROCESS FOR ENAMELING MACHINE

TECHNICAL FIELD

The present invention relates to a method and apparatus for baking and drying coated films of enameled wires, and particularly relates to the enameling process which uses heat energy generated from catalytic combustion process for heating instead of electricity, and in particular the method and apparatus involving a hot-air allocation chamber which enables the rationalized allocation of the heat energy produced during catalytic combustion process to various areas of the oven chamber, while at the same time ensures quality of the enameled wire and lower emission.

BACKGROUND OF THE INVENTION

Fierce competition in the enameled wire industry using existing technology left thin profits for the manufacturers. To save cost, there is no other way out except energy economy. Some manufacturers of enameled wires developed energy-efficient micro-wire oven for enameling machine, the catalytic combustion chamber of which, as part of the waste-gas recovery and utilization device, is situated on the baking side of the oven chamber. The solvent on the enameled wire is evaporated and combusted inside the said combustion chamber, producing hot air which pre-heats and pushes the fresh air downward into the oven chamber. As a result, the energy-saving effect is not obvious.

Numerous manufacturers have therefore made technological reformation to current equipment successively and a number of patents have been filed. For instance, the Chinese utility model numbered 02290021.7 disclosed a technical solution titled "Energy-efficient Micro-wire Oven for Enameling Machine". This technical solution involves an energy-saving micro-wire oven which consists of an oven chamber and a waste-gas recovery and utilization device. Further, the waste-gas recovery and utilization device has its inlet installed close to the evaporation area of the oven chamber, and its outlet connected to the baking area of the oven chamber via the circulating fan and the air distribution pipe.

Although this solution pushes the hot air generated during waste-gas recovery process backward into the inner chamber of the oven, due to the long distance between the single inlet and the evaporation area of the oven chamber, tubular heater is still necessary inside the oven chamber for heating purpose. This prevents the realization of optimal energy-saving effect.

Moreover, this solution is applicable only to model of small processing capacity. If several enameled wires are processed side by side on the same machine simultaneously, this structure will become unserviceable.

Another example, Chinese utility model number 03263874.4 discloses a technical solution named "Dual-circulating Horizontal Oven for Enameled Machine" which still fails to achieve the rationalized allocation of heat energy within the whole oven chamber, though the hot air derived from waste-gas recovery process have been pushed into the chamber at both the evaporation and baking areas. In other words, the middle area of the oven chamber is not supplied with heat energy and thus requires heating by tubular heaters.

In addition, this proposal does not take into full consideration the quality of the enameled wire. Because the enameled wire is most vulnerable to pollution by particles at the evaporation area inside the oven chamber when the solvents are evaporated, it is important while utilizing the circulating hot air to consider the amount of utilized hot air compared to fresh hot air, as well as its areas of coverage.

Besides, this proposal provides no solution to the problem of lower emission standard.

SUMMARY OF THE INVENTION

It is an object of the present invention to provide a method and apparatus for rationalizing the allocation of heat energy generated from the catalytic combustion so as to avoid the deficiency and inadequacy of existing technologies.

According to the design of this invention and to guarantee the quality of the enameled wires, at the evaporation area (the front area of the oven body) where the solvents of the enameled wires are evaporated, the enameled wires are firstly heat-dried by the fresh hot air delivered by the heat exchanger, which helps to harden the film on the surface of the enameled wires, thereby preventing foreign particles from adhering to the surface.

The hot-air allocation chamber then, upon checking the temperature at various processes, regulates the circulating hot air to be delivered to the front area, middle area and back area of the oven body respectively.

Meanwhile, in order to reduce emission, waste gases which are left over at the circulating channel and carry with them many particles will be collected for secondary combustion before being discharged into the air.

To reduce power consumption, this invention allows for paralleled processing of several enameled wires at the same time and the disconnection of power supply to the tubular heater for the oven body after more than one hour's pre-operation until the heat energy produced from catalytic combustion is sufficient to meet the needs of the machine.

The above objects are achieved, according to the present invention, by a method and apparatus for the enameling machine to realize rationalized allocation of heat energy generated from the catalytic combustion process, wherein there is an oven body equipped with a tubular heater, a circulating fan, a heat exchanger and a primary catalytic chamber, wherein the tubular heater for the oven body is used for pre-heating purpose and its power supply will be disconnected upon the normal circulation of the heat energy generated from the catalytic combustion process;

In particular, this method consists of the following steps:

A. First of all to have a circulating fan and a primary catalytic chamber installed above the oven body at a position close to the middle section and front section of the oven body respectively;

B. The above-mentioned circulating fan delivers the circulating hot air produced from catalytic combustion into the hot-air allocation chamber;

C. The circulating hot air is then distributed inside the hot-air allocation chamber, with the circulating hot air in the front area, middle area and back area of the chamber channeled to the front, middle and back areas of the oven body respectively. After that, goes to step D, G and J respectively;

D. At the front area of the oven body and in the direction in which the enameled wires are moving, the enameled wires are first of all be heat-dried by the fresh hot air delivered via the heat exchanger. The fresh hot air goes by the front section of the enameled wire at the front area of the oven body, and provides the oxygen necessary for catalytic combustion;

E. Next, the front circulating hot-air, spouted out from the front hot-air nozzle, blows in the same direction as the enameled wire moves to cover the remaining area of the front oven body. Meanwhile, an organic waste-gas inlet is installed above the front oven body and close to the rear portion, via which all organic waste gas produced at the front oven body during drying process enter the primary catalytic chamber;

F. After that, the organic waste gas is combusted inside the primary catalytic combustion chamber to produce circulating hot air. Return to Step B;

G. Upon entering into the middle area of the oven body, the middle circulating hot-air, spouted out from the middle hot-air nozzle, continue to cure the enameled wires, generating organic waste gas. The pre-drying of the enameled wire is also completed during this process;

H. The middle circulating hot-air, carrying with it moderate amount of organic waste gas, then moves toward the organic waste-gas inlet and enters into the primary catalytic chamber together with the waste gas produced at the front area of the oven body;

I. After that, the organic waste gas is combusted inside the primary catalytic combustion chamber to produce circulating hot air. Return to Step B;

J. Upon entering into the back area of the oven body, the back circulating hot-air, spouted out from the back hot-air nozzle, continue to cure the enameled wires, generating small amount of organic waste gas. The post-drying of the enameled wire is also completed during this process. After that, the back circulating hot-air moves toward the organic waste-gas inlet and enters into the primary catalytic chamber, along with organic waste gases produced by the front and middle areas of the oven body;

K. All the organic waste gas, upon combustion at the primary catalytic chamber, turns into circulating hot air which returns to Step B.

In Step F above, the said organic waste gas, upon catalytic combustion inside the primary combustion chamber and turning into circulating hot air, flows into the hot-air allocation chamber at a flow rate of 30% to 70%, while circulating hot-air of other flow rates enters into the heat exchanger for the interchange of heat with fresh air.

In Step C above, the said hot-air allocation chamber also delivers heated hot-air to the primary catalytic chamber where they mix with the organic waste gas, thereby raising the temperature of the organic waste gas for full combustion. 0 to 30% of the heated hot-air inside the hot-air allocation chamber is distributed.

The front circulating hot-air, middle circulating hot-air and back circulating hot-air inside the hot-air allocation chamber as defined in Step C above, is distributed in the proportion of 10 to 30%, 25 to 45% and 35 to 70% respectively.

In the method defined above, the exhaust coming out of the air outlet of the heat exchanger enters into the secondary catalytic chamber for secondary combustion.

According to the method defined above, a waste-gas collection chamber is installed between the back hot-air nozzle and the exit of the oven body. The waste gas collected here in then guided to the inlet of the heat exchanger for the exchange of heat, and the resulting exhaust is led into the secondary catalytic chamber for secondary combustion.

An apparatus for rationalizing the distribution of the heat energy derived from catalytic combustion process for enameling machine developed based on the above method consists of an oven body, a circulating fan, a heat exchanger and a primary catalytic chamber, Wherein the circulating fan is installed above the oven body and close to the middle portion of the oven body, while the primary catalytic chamber is installed close to the front portion of the oven body;

Wherein the primary catalytic chamber is connected to the hot-air allocation chamber via the circulating fan, through which the circulating hot air generated during the catalytic combustion process is delivered into the hot-air allocation chamber;

Wherein the said hot-air allocation chamber is connected to the front area, middle area and back area of the oven body through the front air flue, middle air flue and back air flue, thereby sending the front circulating hot-air, middle circulating hot-air and back circulating hot-air to these areas respectively;

Wherein this apparatus has an organic waste-gas inlet deployed above the oven body nearing its front area, still above the said inlet, is the primary catalytic chamber. Thus, this invention is of horizontal structure, which is rational, occupies small space and helps to keep the pipes warm.

Wherein the said primary catalytic chamber has two outlets which are connected to the air inlet of the heat exchanger and the air inlet of the hot-air allocation chamber respectively situated on the top and on the side of the primary catalytic chamber.

The air inlet of the heat exchanger as defined above has an adjusting damper which is used to regulate the flow rate of the circulating hot air passing into the heat exchanger.

The hot-air allocation chamber as defined above has a hot-air adjusting damper inside which regulates the flow rate of the back circulating hot-air accessing into the back air flue.

Where the said back air flue and the back area of the oven body join is the back hot-air nozzle. Meanwhile, a waste-gas collection chamber is installed in between the said back hot-air nozzle and the exit of the oven body. A waste gas pipe is led out of the said waste-gas collection chamber to connect with the air inlet of the heat exchanger. A waste-gas adjusting damper is also made available inside the pipe.

Compared to existing technology, this invention of horizontal structure can save the space occupied by the machine and ease installation and setup. The guarantee of baking temperature and the reasonable allocation of the heat energy accelerate baking speed, thereby improving productivity by 20%.

In addition to the connection of waste gas lingering at the dead space for secondary catalytic combustion, this invention also ensures primary catalytic combustion of the circulating hot air repeatedly. As a result, the emission is reduced to only 50 mg/m$^3$, far lower than national emission standard 120 mg/m$^3$.

This invention also save power consumption by 50% for the tubular heater for the oven body is stopped just one hour after the machine goes into operation and, from that point, the heat energy derived during catalytic combustion process is utilized for this purpose.

BRIEF DESCRIPTION OF THE DRAWING

FIG. 1 is a block diagram illustrating the principle by which the method and apparatus for rationalizing the allocation of the heat energy generated from catalytic combustion process for enameling machine according to this invention operates.

DESCRIPTION OF THE PREFERRED EMBODIMENTS

The present invention will now be further described by referring to the accompanying drawing FIG. 1 that illustrates the preferred embodiment of this invention.

Refer to FIG. 1, a method can be employed for the enameling machine to achieve rationalized allocation of heat energy generated from catalytic combustion process, which involves an oven body 10 equipped with a tubular heater 15, a circulating fan 30, a heat exchanger 50 and a primary catalytic chamber 20, wherein the tubular heater 15 for the oven body is used for pre-heating purpose and its power supply will be disconnected upon the normal circulation of the heat energy generated from the catalytic combustion process.

In particular, this method consists of the following steps:
A. First of all to have a circulating fan 30 and an primary catalytic chamber 20 installed above the oven body 10 at a position close to the middle section and front section of the oven body respectively;
B. The above-mentioned circulating fan 30 delivers the circulating hot air produced from catalytic combustion into the hot-air allocation chamber 40;
C. The circulating hot air is then distributed inside the hot-air allocation chamber 40, with the circulating hot air in the front area, middle area and back area of the chamber channeled to the front area 11, middle area 12 and back area 13 of the oven body respectively. After that, goes to step D, G and J respectively;
D. At the front area 11 of the oven body and in the direction in which the enameled wires 1 are moving, the enameled wires are first of all be heat-dried by the fresh hot air 52 containing fresh air delivered by the heat exchanger 50 and spouted out of the fresh hot-air nozzle 511. The fresh hot air 52 goes by the front section of the enameled wires 1 at the front area 11 of the oven body, and provides the oxygen necessary for catalytic combustion;
E. Next, the front circulating hot-air, spouted out from the front hot-air nozzle 411, blows in the same direction the enameled wires 1 move to cover the remaining area of the front oven body 11. Meanwhile, an organic waste-gas inlet 21 is installed above the front oven body 11 close to the rear portion of the oven body, via which all organic waste gas produced at the front oven body 11 during drying process enters the primary catalytic chamber 20;
F. After that, the organic waste gas is combusted inside the primary catalytic chamber 20 to produce circulating hot air. Return to Step B;
G. Upon entering into the middle area 12 of the oven body, the middle circulating hot-air, spouted out from the middle hot-air nozzle 421, continue to cure the enameled wires 1, generating organic waste gas. The pre-drying of the enameled wire 1 is also completed during this process;
H. The middle circulating hot-air, carrying with it moderate amount of organic waste gas, then moves toward the organic waste-gas inlet 21 and enters into the primary catalytic chamber 20 together with the waste gas produced at the front oven body;
I. After that, the organic waste gas is combusted inside the catalytic combustion chamber 20 to produce circulating hot air. Return to Step B;
J. Upon entering into the back area 13 of the oven body, the back circulating hot-air, spouted out from the back hot-air nozzle 431, continue to cure the enameled wires 1, generating small amount of organic waste gas. The post-drying of the enameled wire is also completed during this process. After that, the back circulating hot-air moves toward the organic waste-gas inlet 21 and enters into the primary catalytic chamber 20, along with organic waste gases produced at the front and middle areas of the oven body;
K. All the organic waste gas, upon combustion at the primary catalytic chamber 20, turns into circulating hot-air which returns to Step B.

In Step F of the method defined above, the said organic waste gas, upon catalytic combustion inside the primary combustion chamber 20 and turning into circulating hot-air, flows into the hot-air allocation chamber 40 at a flow rate of 30% to 70%, while circulating hot-air of other flow rates enters into the heat exchanger 50 for the interchange of heat with fresh air 80.

In Step C of the method defined above, the said hot-air allocation chamber 40 also delivers heated hot-air to the primary catalytic chamber 20 where they mix with the organic waste gas, thereby raising the temperature of the organic waste gas for full combustion. 0 to 30% of the heated hot air inside the hot-air allocation chamber 40 is distributed.

The heated hot-air is then delivered to the primary catalytic chamber 20 via the heating pipe 44.

The front circulating hot-air, middle circulating hot-air and back circulating hot-air inside the hot-air allocation chamber 40 as defined in Step C above, is distributed in the proportion of 10 to 30%, 25 to 45% and 35 to 70% respectively.

In the method defined above, the exhaust coming out of the air outlet of the heat exchanger 50 enters into the secondary catalytic chamber 70 for secondary combustion.

According to the method defined above, a waste-gas collection chamber 60 is installed between the back hot-air nozzle 431 and the exit of the oven 16. The waste gas collected here in then guided to the inlet of the heat exchanger 50 for the exchange of heat, and the resulting exhaust is led into the secondary catalytic chamber 70 for secondary combustion.

An apparatus for rationalizing the distribution of the heat energy derived from catalytic combustion process for enameling machine developed based on the method defined above (refer to FIG. 1) consists of an oven body 10, a circulating fan 30, a heat exchanger 50 and a primary catalytic chamber 20, Wherein the circulating fan 30 is installed above the oven body 10 and close to the middle portion of the oven body, while primary catalytic chamber 20 is installed close to the front portion of the oven body 10;

Wherein the primary catalytic chamber 20 is connected to the hot-air allocation chamber 40 via the circulating fan 30, through which the circulating hot air generated during the catalytic combustion process is delivered into the hot-air allocation chamber 40;

Wherein the said hot-air allocation chamber 40 is connected to the front area 11, middle area 12 and back area 13 of the oven body through the front air flue 41, middle air flue 42 and back air flue 43, thereby sending the front circulating hot-air, middle circulating hot-air and back circulating hot-air to these areas respectively;

Wherein this apparatus has an organic waste-gas inlet 21 deployed above the oven body 10 nearing its front area 11, still above the said inlet, is the primary catalytic chamber 20.

Wherein the said primary catalytic chamber 20 has two outlets which are connected to the air inlets of the heat exchanger 50 and the hot-air allocation chamber 40 situated respectively on the top and on the side of the primary catalytic chamber 20.

The air inlet of the heat exchanger as defined above has an adjusting damper (not indicated in the drawing) which is used to regulate the flow rate of the circulating hot air passing into the heat exchanger 50.

The hot-air allocation chamber as defined above has a hot-air adjusting damper inside which regulates the flow rate of the back circulating hot-air accessing into the back air flue.

Where the said back air flue 43 and the back area 13 of the oven body join is the back hot-air nozzle 431. Meanwhile, a waste-gas collection chamber 60 is installed in between the said back hot-air nozzle 431 and the exit of the oven body 16. A waste gas pipe 61 is led out of the said waste gas collection chamber 60 to connect with the air inlet of the heat exchanger. A waste gas adjusting damper is also made available inside the pipe.

The said heat exchanger 50 is connected to the fresh hot-air passage 51. According to one preferred example of this invention, the fresh air 80 entering into the heat exchanger 50 is exported out via the fresh hot-air passage 51 after being heated. Being close to the primary catalytic chamber 20, the fresh hot-air passage 51 allows for the further heating of the fresh hot-air 52 due to the extreme heat inside the primary catalytic chamber 20 and in particular, the heated air delivered by the heating pipe 44 which enters into the primary catalytic chamber 20 nearby. Moreover, the wall separating the fresh hot-air passage 51 and the primary catalytic chamber 20 radiates heat to the fresh hot air 52 inside the passage.

This invention carefully defines the front area 11, middle area 12 and back area 13 of the oven body 10. In order to distribute the circulating hot air into various areas in a rational manner, and in light of the distance between the hot-air allocation chamber 40 and these areas, the maximum air volume to be allocated to each area is determined. This enables the division of these areas. Based on our experiment and in terms of length, it is optimal for the front area 11, middle area 12 and back area 13 to take up 18 to 28%, 38 to 48% and 28 to 38% of the total oven body respectively.

As long as the maximum air volume distributed to each area is determined, it is necessary to define the diameter of the pipe linking the hot-air allocation chamber 40 and each area. It is natural that the said air volume will need to be regulated in actual operation.

Above all, in order to give full play to the fresh hot air 52 at the forefront of the front area 11, it is required to make the most use of its temperature and rate of flow.

As illustrated in FIG. 1, the venting of the secondary catalytic chamber 70 still has high temperature and will be further utilized during heat-energy multiple utilization process 90. For example, it may be used to provide hot water for the factory, or through the exchange of heat, used to dry articles, etc.

As described above, the present invention achieves a breakthrough: This invention enables the complete disconnection of the tubular heater 15 for the oven body upon completion of the preheating process. The heat energy generated by the catalytic combustion of waste gas alone can support the operation of the enameling machine. In addition to the emission which is far below the national regulated standard, it improves productivity, ensures product quality and greatly reduces power consumption.

The foregoing descriptions of the embodiments are intended to illustrate and not to limit this invention. Various changes and modifications may be made to the embodiments by those of ordinary skill in the art without departing from the spirit of the invention. The accompanying claims are intended to cover such modifications as would fall within the true scope and spirit of the present invention.

What is claimed is:

1. An apparatus for rationalizing allocation of heat energy generated from a catalytic combustion process in enameling machines each comprising an oven body equipped with a tubular heater, a circulating fan, a heat exchanger and a primary catalytic chamber, wherein the circulating fan is installed above the oven body and close to a middle portion of the oven body, while the primary catalytic chamber is installed close to a front portion of the oven body;

wherein the primary catalytic chamber is connected to a hot-air allocation chamber via the circulating fan, through which circulating hot air generated during the catalytic combustion process is delivered into the hot-air allocation chamber;

wherein the hot-air allocation chamber is connected to the primary catalytic chamber via a heating pipe and to the front portion, middle portion and a back portion of the oven body through a front air flue, a middle air flue and a back air flue respectively, thereby sending hot air to the primary catalytic chamber and front circulating hot-air, middle circulating hot-air and back circulating hot-air respectively;

wherein an organic waste-gas inlet is deployed above the oven body adjacent the front portion, and wherein above the inlet, is the primary catalytic chamber.

2. The apparatus as defined in claim 1, wherein the primary catalytic chamber has two outlets which are connected to the air inlets of the heat exchanger and the hot-air allocation chamber situated respectively on the top and on the side of the primary catalytic chamber.

3. The apparatus as defined in claim 2, wherein the air inlet of the heat exchanger has an adjusting damper which is used to regulate the flow rate of the circulating hot air passing into the heat exchanger.

4. The apparatus as defined in claim 1, wherein the hot-air allocation chamber has a hot-air adjusting damper inside which regulates the flow rate of the back circulating hot-air accessing into the back air flue.

5. The apparatus as defined in claim 1, wherein a back hot-air nozzle is installed where the back air flue and the back area of the oven body joined and wherein a waste-gas collection chamber is installed between the back hot-air nozzle and an exit of the oven body and wherein a waste gas pipe is led out of the waste gas collection chamber to connect with an air inlet of the heat exchanger and wherein a waste gas adjusting damper is arranged inside the waste gas pipe.

6. A method for allocating heat energy generated from a catalytic combustion process in an enameling machine, the enameling machine comprising an oven body equipped with a tubular heater, a circulating fan, a heat exchanger and a primary catalytic chamber, the method comprising:

installing a circulating fan and a primary catalytic chamber above the oven body adjacent a middle section and a front section of the oven body respectively;

delivering circulating hot air produced from a catalytic combustion process in the primary catalytic chamber into a hot-air allocation chamber;

distributing the circulating hot air in the front section, the middle section and a back section of the hot-air allocation chamber to the front, middle and back sections of the oven body respectively and recirculating a portion of the hot air to the primary catalytic chamber;

heat-drying enameled wires by fresh hot air delivered via the heat exchanger in the front area of the oven body and providing oxygen necessary for catalytic combustion;

installing an organic waste-gas inlet above the front oven body such that organic waste gas produced in the oven body enters the primary catalytic chamber; and combusting the organic waste gas inside the primary catalytic combustion chamber to produce the circulating hot air.

7. The method of claim 6, wherein the organic waste gas, upon catalytic combustion inside the primary combustion chamber and heating the circulating hot-air, the circulating hot-air flows into the hot-air allocation chamber at a flow rate of 30% to 70%, while remaining circulating hot-air of 70% to 30% enters the heat exchanger for the interchange of heat with fresh air.

8. The method as defined in claim 7, wherein part of exhaust released from the primary catalytic chamber is led into a secondary catalytic chamber for secondary combustion and wherein a waste-gas collection chamber is installed between the back hot-air nozzle and the exit of the oven such that waste gas is collected and guided to an inlet of the heat exchanger for exchange of heat and wherein resulting exhaust is led into the secondary catalytic chamber for secondary combustion.

9. The method as defined in claim 6, wherein the front circulating hot-air, middle circulating hot-air and back circulating hot-air inside the hot-air allocation chamber is distributed in the proportion of 10 to 30%, 25 to 45% and 35 to 70% respectively.

* * * * *